US012224095B2

(12) United States Patent
Maurer

(10) Patent No.: US 12,224,095 B2
(45) Date of Patent: Feb. 11, 2025

(54) ELECTRONIC SWITCHING DEVICE FOR DEMAGNETIZING FERROMAGNETIC MATERIAL

(71) Applicant: Maurer Magnetic AG, Grüningen (CH)

(72) Inventor: Albert Maurer, Gruet (CH)

(73) Assignee: Maurer Magnetic AG, Grüningen (CH)

( * ) Notice: Subject to any disclaimer, the term of this patent is extended or adjusted under 35 U.S.C. 154(b) by 77 days.

(21) Appl. No.: 18/036,943

(22) PCT Filed: Dec. 8, 2021

(86) PCT No.: PCT/EP2021/084793
§ 371 (c)(1),
(2) Date: May 15, 2023

(87) PCT Pub. No.: WO2022/128685
PCT Pub. Date: Jun. 23, 2022

(65) Prior Publication Data

US 2023/0420171 A1 Dec. 28, 2023

(30) Foreign Application Priority Data

Dec. 17, 2020 (CH) .................................... 01609/20

(51) Int. Cl.
*H01F 13/00* (2006.01)

(52) U.S. Cl.
CPC .................................. *H01F 13/006* (2013.01)

(58) Field of Classification Search
CPC .............. B60L 53/124; G08B 13/2411; H02M 3/33507; H02M 1/08; H02M 1/34;
(Continued)

(56) References Cited

U.S. PATENT DOCUMENTS

| | | | |
|---|---|---|---|
| 4,599,673 A | 7/1986 | Truskalo | |
| 2005/0275507 A1 | 12/2005 | Hall et al. | |
| 2019/0229615 A1* | 7/2019 | Sanders | H02M 3/156 |

FOREIGN PATENT DOCUMENTS

| | | |
|---|---|---|
| EP | 0021274 A1 | 1/1981 |
| EP | 0597181 A1 | 5/1994 |

OTHER PUBLICATIONS

International Preliminary Report on Patentability, dated Jun. 13, 2023, for PCT/EP2021/084793.

(Continued)

*Primary Examiner* — Bryan R Perez
(74) *Attorney, Agent, or Firm* — Paul D. Bianco; Fleit Intellectual Property Law

(57) ABSTRACT

An electronic circuit for demagnetizing ferromagnetic material includes a voltage source and a conductor loop connected thereto, a demagnetizing resonant circuit is arranged in the conductor loop for forming a decaying alternating magnetic field. In the conductor loop, a resonant circuit battery switch is arranged in series with the demagnetizing resonant circuit, and a recharge resonant circuit for pulsed recharging of a charging current into the demagnetizing resonant circuit is arranged in parallel with the demagnetizing resonant circuit and with the resonant circuit battery switch. A recharge store which is arranged in parallel with the voltage source, with the recharge resonant circuit and with the demagnetizing resonant circuit, as well as a recharge switch for interrupting a charging current from the recharge store are located in the conductor loop. The circuit can be operated by a controller for controlling the voltage source and all switches.

18 Claims, 2 Drawing Sheets

(58) Field of Classification Search
CPC .. H02M 1/12; H02J 50/12; H04N 9/29; H01F 13/006; H01F 13/003
See application file for complete search history.

(56) References Cited

OTHER PUBLICATIONS

International Search Report dated Mar. 24, 2022 with Written Opinion for PCT/EP2021/084793 filed Dec. 8, 2021.

* cited by examiner

ELECTRONIC SWITCHING DEVICE FOR DEMAGNETIZING FERROMAGNETIC MATERIAL

TECHNICAL FIELD

The invention relates to an electronic switching device for demagnetizing ferromagnetic material by means of a resonance oscillation with a prolonged decay time. This device comprises a voltage source and a conductor loop connected thereto, in which a demagnetizing resonant circuit is arranged in order to form a decaying, alternating magnetic field, in which ferromagnetic material can be demagnetized during a decay time. The switching device can be operated with a controller for controlling the voltage source and all switches.

Various devices are known for demagnetizing ferromagnetic bodies. As a rule, alternating magnetic fields with degressive amplitude are used. These magnetic fields are generated with conductor coils, also called demagnetizing coils, through which an electric current flows according to the desired strength of the magnetic field. The demagnetizing coil and the body to be demagnetized are usually in a mutually fixed position relative to each other during the demagnetizing process.

In order to ensure the complete penetration of the alternating polarity magnetic field into the body to be demagnetized during this process in the shortest possible time and with the lowest possible energy consumption, the aim is to generate a sinusoidal current waveform. The easiest way to achieve this is by using an electrical circuit operating at resonance, as described above.

The advantages of this circuit lie in its particularly simple design, in the secure maintenance of a degressive amplitude for the demagnetizing current and in the almost lossless conversion of the energy supplied into the demagnetizing process. Such demagnetizing circuits, which are based on the freely decaying oscillation of a resonant circuit, are described, for example, in U.S. Pat. No. 4,599,673 and EP 0021274.

A crucial disadvantage of such demagnetizing circuits is the rapid degradation of the amplitude for the demagnetizing current, which results in a deficient effect of this circuit in the demagnetizing process. This degradation, which is defined by the decrement in current and voltage in the resonant circuit, is predetermined in the design of the demagnetizing coil for physical and material-technology reasons. It consists of the losses caused by the copper resistance of the demagnetizing coil, defined by the dimensions and structure of the latter as well as the hysteresis and eddy-current losses in the body to be demagnetized.

Document EP 0597181 also deals with a method for demagnetizing magnetic materials in a decaying alternating magnetic field. A parallel resonant circuit comprising two coils and a capacitor, into which energy is fed in synchronously with the magnetic interaction in order to prolong the decay time. In order to achieve this, a complex circuit with a sinewave to square-wave converter, a square-wave generator and a monoflop is proposed, in order to introduce energy from a recharging capacitor into the capacitor of the parallel resonant circuit in a clocked manner.

DESCRIPTION SUMMARY OF THE INVENTION

One aspect of the present invention relates to a device based on the aforementioned electronic switching device, which has a prolonged decay time but also indicates a practical solution which can be realized with a small number of circuit components and a comparatively simply designed controller.

In addition, it is desirable that the switching device according to the invention can be operated with a single power source and/or that it does not require components comprising integrated circuits (IC).

The objects are achieved by an electronic switching device having the features of the first patent claim. According to the invention, a switching device as described at the beginning also comprises

- a resonant circuit charging switch in the conductor loop, in series with the demagnetizing resonant circuit,
- a recharging resonant circuit in the conductor loop, arranged in parallel with the demagnetizing resonant circuit and with the resonant circuit charging switch, for the pulsed recharging of a charging current into the demagnetizing resonant circuit with the resonant circuit charging switch closed in each case,
- a recharging store, which is arranged in parallel with the voltage source, with the recharging resonant circuit and with the demagnetizing resonant circuit, for supplying power to the recharging resonant circuit during the decay time,
- a recharging switch in the conductor loop for interrupting a charging current from the voltage source and from the recharging store to the recharging resonant circuit and to the demagnetizing resonant circuit,
- a charging switch for interrupting the charge source to the recharging store, to the recharging resonant circuit and to the demagnetizing resonant circuit, wherein during operation, recharging pulses can be introduced into the demagnetizing resonant circuit from the recharging resonant circuit by means of a controller by opening and closing the switches, to prolong the decay time until the energy from the recharging store is used up.

With such a switching device, the demagnetizing resonant circuit, the recharging resonant circuit and the recharging store can be charged at the beginning of the procedure by the voltage source, which is then disconnected by a switch. Subsequently, the resonance oscillation of the demagnetizing resonant circuit is set in motion and then periodically, one or more recharging pulses from the recharging resonant circuit are introduced into the resonance oscillation, preferably after the zero crossing of the resonant circuit voltage. The recharging resonant circuit is finally charged again by the recharging store so that it is ready to deliver the next pulse. This is repeated until the recharging store is exhausted. Due to these energy surges, the decay time of the resonance oscillation is prolonged.

Using this device it is possible to operate with only one voltage source. It is important here that a second resonant circuit is used as the recharging resonant circuit. In this circuit, which only executes one half-oscillation at a time, the charge can be reversed with a polarity reversing switch so that the circuit can deliver recharging pulses in the positive and negative directions, although it is always charged in the same way by the recharging store. Alternatively, a polarity reversing switch could also be arranged between the recharging store and the recharging resonant circuit, which constantly charges the recharging resonant circuit in alternating directions.

No integrated circuits (IC) are used, which reduces the susceptibility to interference and increases the service life and hence the reliability of this circuit.

Further embodiments according to the invention are described in the dependent claims.

BRIEF DESCRIPTION OF THE DRAWINGS

In the following, the invention is described in more detail with reference to the drawings. In these.

WAYS OF EMBODYING THE INVENTION

Figure 1:
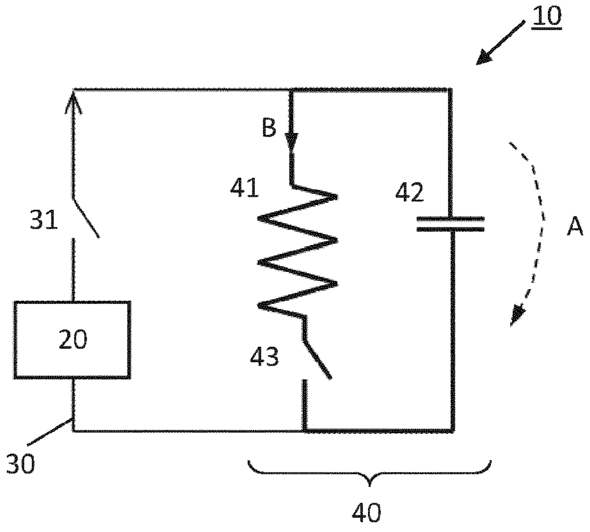
FIG. 1 shows a schematic representation of an electronic circuit for generating a decaying resonance oscillation.

FIG. 1 shows in a schematic representation an electronic circuit 10 according to the invention for demagnetizing ferromagnetic material.

The circuit 10 comprises a demagnetizing coil 41 and a resonant circuit capacitor 42, which are connected via a resonant circuit switch 43 to a demagnetizing resonant circuit 40. At the beginning of the process, the resonant circuit switch 43 is open. The demagnetizing resonant circuit 40 is connected via a conductor loop 30 to a current source 20, which can charge the resonant circuit capacitor 42. The charging process can be interrupted via a resonant circuit charging switch 31.

Figure 2:
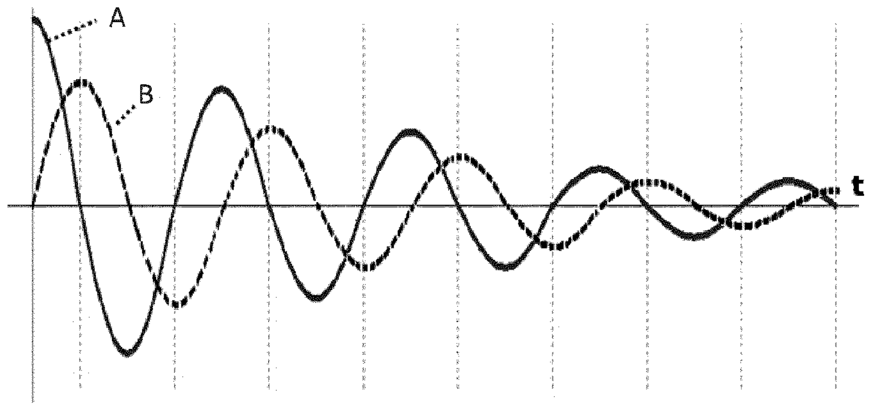
FIG. 2 shows a graph of a decaying resonance oscillation according to FIG. 1 against time.

Once this charging process is completed with the resonant circuit voltage A, the resonant circuit charging switch 31 is opened and so the charging current is interrupted. After the resonant circuit switch 43 is closed, a resonance oscillation is set in motion: the resonant circuit capacitor 42 discharges via the demagnetizing coil 41. The current prevailing in the resonant circuit corresponds to a free-running oscillation at the natural frequency with exponentially decaying amplitude. FIG. 2 shows the resonance oscillation in this demagnetizing resonant circuit 40 in the form of the curves of the resonant circuit voltage A and the demagnetizing current B against time t. After the amplitudes of the resonant circuit voltage A and demagnetizing current B have decayed, the resonant circuit switch 43 is opened again and the circuit 10 is available for the next demagnetizing cycle, which begins again by the closing of the resonant circuit charging switch 31.

Figure 3:
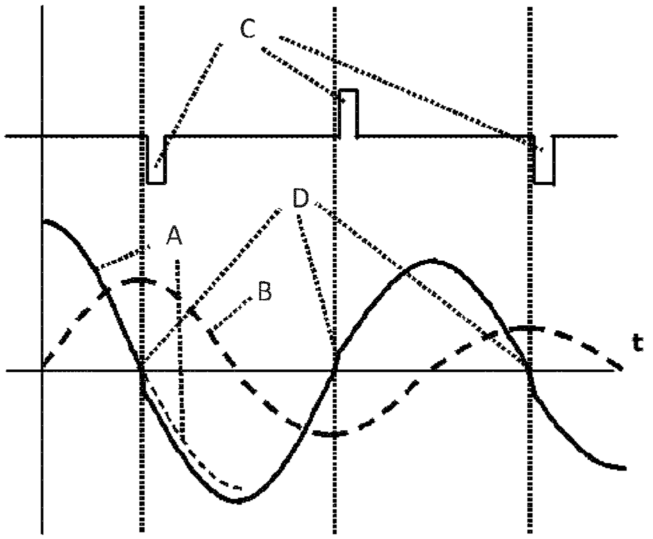
FIG. 3 shows an excerpt of the oscillation from FIG. 2 under the influence of recharging pulses.

FIG. 3 shows an excerpt from the process of the decaying oscillation from FIG. 2 with a resonant circuit voltage A and a demagnetizing current B, wherein with a recharging current shown above them, recharging pulses C are introduced at regular time intervals. The latter are bipolar current pulses that are each fed in at the time immediately after the zero crossing D of the resonant circuit voltage A. Due to the additional energy supplied, the decaying oscillation is delayed, and the amplitudes of the resonant circuit voltage A and demagnetizing current B thus decrease more slowly. This principle is well known, but it has been shown that its implementation in terms of circuit technology is cumbersome.

Figure 4:
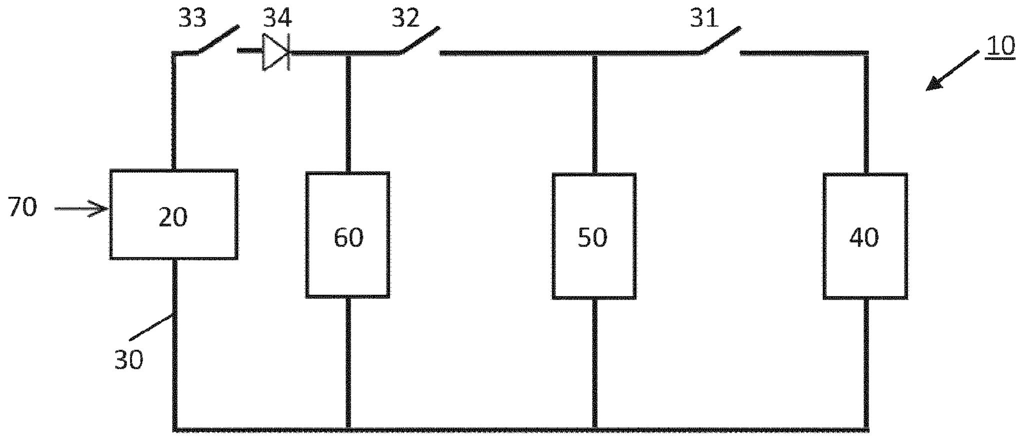
FIG. 4 shows a schematic representation of an electronic circuit according to the invention for generating a prolonged decaying resonance oscillation.
Figure 5:
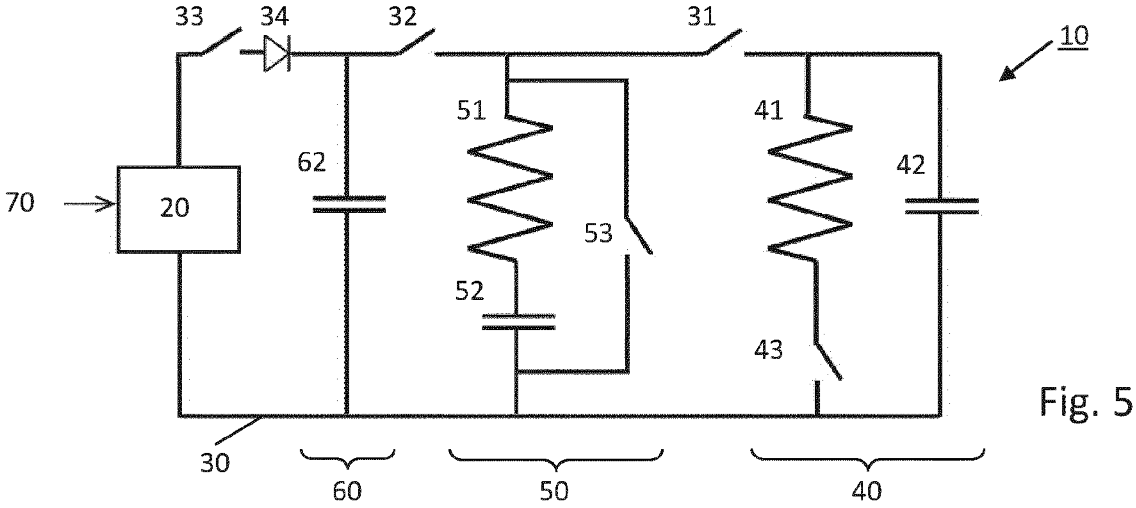
FIG. 5 shows the circuit according to claim 4 in a preferred embodiment.

The embodiments according to the invention are shown in a general form in FIG. 4 and in a preferred version in FIG. 5. In FIG. 5, the components 40, 50 and 60 are shown as examples in the form of electronic components. Optionally, only individual ones may be designed in this form.

FIG. 4 shows an electronic circuit 10 for demagnetizing ferromagnetic material by means of a resonance oscillation with a prolonged decay time. The circuit comprises a voltage source 20 and a conductor loop 30 connected thereto, in which a demagnetizing resonant circuit 40 is connected in order to form a decaying, alternating magnetic field in which ferromagnetic material can be demagnetized during a decay time t. This demagnetizing resonant circuit 40 can be constructed as described in FIG. 1. Such a design was shown in FIG. 5 as an example. However, other arrangements of demagnetizing resonant circuits 40 are also known. Together with the resonant circuit charging switch 31, which is arranged in series with the demagnetizing resonant circuit 40 in the conductor loop 30, the demagnetizing process described in FIG. 1 can be carried out.

The electronic circuit 10 also comprises a recharging resonant circuit 50 in the conductor loop 30, which is arranged in parallel with the demagnetizing resonant circuit 40 and the resonant circuit charging switch 31. It is used to perform a pulsed recharging of a charging current into the demagnetizing resonant circuit 40 with the resonant circuit charging switch 31 closed momentarily in each case. As described above in relation to FIG. 1, energy which is stored in the recharging resonant circuit 50 can be introduced into the demagnetizing resonant circuit 40 at regular intervals as short recharging pulses C. The term “short” refers to the much shorter duration t compared to an entire period of the resonance oscillation in the demagnetizing resonant circuit 40, as shown in FIGS. 2 and 3.

The natural frequency of the recharging resonant circuit 50 is preferably at least 10 times, preferably at least 100 times, greater than the natural frequency of the demagnetizing resonant circuit 40.

Further, the conductor loop 30 of the electronic circuit 10 comprises a recharging store 60, which is arranged in parallel with the voltage source 20, the recharging resonant circuit 50, and the demagnetizing resonant circuit 40. The store is provided for supplying power to the recharging resonant circuit 50 during the decay time t. In addition, a recharging switch 32 is arranged in the conductor loop 30 which, when opened, interrupts the charging current from the voltage source 20 and from the recharging store 60 to the recharging resonant circuit 50 and to the demagnetizing resonant circuit 40.

Finally, the electronic circuit 10 in the conductor loop 30 comprises a charging switch 33, which when opened interrupts the connection from the charge source 20 to the recharging store 60, to the recharging resonant circuit 50 and to the demagnetizing resonant circuit 40. The charging switch 33 thus decouples the charge source 20 from the rest of the electronic circuit 10.

In operation, a controller 70 controls all switches 31, 32, 33, 43, 53, and by opening and closing the switches 31, 32, 53 can introduce recharging pulses C from the recharging resonant circuit 50 into the demagnetizing resonant circuit 40, for prolonging the decay time until the energy from the recharging store 60 is exhausted.

Preferably, a rectifier diode 34 is arranged in the conductor loop 30 in series with the voltage source 20 and the charging switch 33, in such a way that said diode can prevent feedback from the recharging store 60, from the recharging resonant circuit 50 and the demagnetizing resonant circuit 40 into the voltage source 20 during use.

When the switches—charging switch 33, recharging switch 32 and resonant circuit charging switch 31—are closed, the demagnetizing resonant circuit 40, the recharging resonant circuit 50 and the recharging store 60 are charged. The mentioned switches 33, 32 and 31 are then opened again.

In this state, the demagnetizing process can begin. Until the end of this process, no more energy is supplied from the voltage source 20. The charging switch 33 remains open during this time; the voltage source 20 therefore remains decoupled from the rest of the circuit 10.

At this time, the entire energy, which can be recharged until the end of the resonance oscillation of the demagnetizing resonant circuit 40, is contained in the recharging store 60. This comprises, for example, a storage capacitor 62, as shown in FIG. 5. This means that only a single voltage source 20 is needed. The capacitance of the storage capacitor 62 is preferably at least twice as large, preferably at least three times as large, as that of the resonant circuit capacitor 42.

All switches 31, 32, 33 are controlled by the controller 70, which preferably also controls the voltage source 20. In addition, other switches can be controlled by this controller 70. The controller 70 can be separate from the circuit 10 or be part of it.

As already described in relation to FIG. 3, the resonant circuit charging switch 31 is briefly opened after the resonance oscillation in the demagnetizing resonant circuit 40 has begun and the resonant circuit voltage A has passed through the zero point D. The recharging resonant circuit 50 then delivers its recharging pulse C to the demagnetizing resonant circuit 40. The resonant circuit charging switch 31 is closed again.

By opening the recharging switch 32, the recharging resonant circuit 50 is now charged by a current flowing from the recharging store 60. When the recharging resonant circuit 50 is fully charged again, the recharging switch 32 is closed again. Now, the recharging resonant circuit 50 is ready again to deliver a further recharging pulse C to the demagnetizing resonant circuit 40 after the next zero crossing of the resonant circuit voltage A in this circuit. By means of the controller 70, the resonant circuit charging switch 31 is opened again briefly at the correct time, for a time much shorter than a quarter period of the resonance oscillation.

This process is repeated until the energy in the recharging store 60 is exhausted.

It must be ensured that the recharging pulses C have the correct signs in each case. These must alternate. The recharging resonant circuit 50 preferably comprises, as shown in FIG. 5, a recharging coil 51 and a recharging capacitor 52 arranged in series therewith. When charging and discharging the recharging capacitor 52, a half-oscillation of the recharging resonant circuit 50 is executed in each case. In order to change the polarity, a polarity reversing switch 53 can preferably be arranged in parallel with the recharging coil 51 and the recharging capacitor 52, for reversing the polarity of the charge in the recharging capacitor 52 during a half-oscillation. After every second charge of the recharging capacitor 52 the polarity reversing switch 53 is opened for a half-oscillation, so that the polarity in the recharging capacitor 52 changes.

Alternatively, an changeover switch may be provided between the recharging store 60 and the recharging resonant circuit to charge the recharging capacitor 52 in the reverse direction at every second charge.

In the method according to the invention for generating a decaying electromagnetic field, an electronic circuit 10 described here is used to demagnetize ferromagnetic material during a decay time. Firstly, the demagnetizing resonant circuit 40, the recharging resonant circuit 50 and the recharging store 60 are charged by means of the voltage source 20, while the charging switch 33, the recharging switch 32 and the resonant circuit charging switch 31 are closed.

The mentioned switches 31, 32 and 33 are then opened again. The resonance oscillation is started at its natural frequency and with a decaying amplitude, for example by closing the resonant circuit switch 43. An alternating magnetic, periodic demagnetizing field is produced.

Next, by briefly closing and opening the resonant circuit charging switch 31, a short, first recharging pulse C in the form of a recharging current is introduced into the demagnetizing resonant circuit 40 from the recharging resonant circuit 50.

The recharging resonant circuit 50 is then charged by the recharging store 60 by briefly closing and opening the recharging switch 32. The last two steps are repeated until the energy supply in the recharging store 60 is exhausted.

In a preferred method, each first recharging pulse C is followed by one or more further short recharging pulses C with the same sign and these are transferred to the demagnetizing resonant circuit 40. The total duration of the series of recharging pulses C is no more than one quarter, preferably no more than one eighth of an oscillation period of the demagnetizing resonant circuit 40. Each first recharging pulse C is preferably fed directly into the resonance oscillation of the demagnetizing resonant circuit after a zero crossing of the resonant circuit voltage A. Since the resonant circuit voltage A changes sign as a result, the sign of each subsequent first recharging pulse C must also be changed accordingly.

To achieve this, the polarity of the charge in the recharging capacitor 52 is reversed. This can be achieved by providing the recharging resonant circuit 50 with a polarity reversing switch 53. The polarity reversing switch 53 is closed with the recharging switch 32 open and the resonant circuit charging switch 31 open, causing a resonance oscillation of the capacitor 52 and the recharging coil 51 to appear in the recharging resonant circuit 50, which is interrupted again after a half-oscillation by opening the polarity reversing switch 53. Each first recharging pulse C therefore preferably begins exactly half a period of the resonance oscillation of the demagnetizing resonant circuit 40 later than the previous first recharging pulse C.

At or before the start of the method, a ferromagnetic workpiece is brought into the effective range of the demagnetizing resonant circuit 40 in order to demagnetize said workpiece. If necessary, the procedure described here can be repeated multiple times.

The circuit 10 described here and the method carried out therewith permit a simple and safe demagnetization of ferromagnetic bodies. The circuit is composed of simple components that enable a safe, trouble-free process.

LIST OF REFERENCE SIGNS

10 electronic circuit; circuit
20 voltage source
30 conductor loop
31 resonant circuit charging switch
32 recharging switch
33 charging switch
34 rectifier diode
40 demagnetizing resonant circuit
41 demagnetization coil
42 resonant circuit capacitor
43 resonant circuit switch

50 recharging resonant circuit
51 recharging coil
52 recharging capacitor
53 polarity reversal switch
60 recharging store
62 storage capacitor
70 controller
A resonant circuit voltage
B demagnetizing current
C recharging pulse
D zero crossing, zero point
t time

The invention claimed is:

1. An electronic circuit for demagnetizing ferromagnetic material using a resonance oscillation having a prolonged decay time, the electronic circuit comprising a voltage source and a conductor loop connected thereto, a demagnetizing resonant circuit in the conductor loop, for forming a decaying, alternating magnetic field in which ferromagnetic material can be demagnetized during a decay time, a resonant circuit charging switch in the conductor loop, in series with the demagnetizing resonant circuit, a recharging resonant circuit in the conductor loop, arranged in parallel with the demagnetizing resonant circuit and with the resonant circuit charging switch, for pulsed recharging of a charging current into the demagnetizing resonant circuit with the resonant circuit charging switch closed in each case, a recharging store, which is arranged in parallel with the voltage source, with the recharging resonant circuit and with the demagnetizing resonant circuit, for supplying power to the recharging resonant circuit during the decay time, a recharging switch in the conductor loop for interrupting a charging current from the voltage source and from the recharging store to the recharging resonant circuit and to the demagnetizing resonant circuit, a charging switch for interrupting the charge source to the recharging store, to the recharging resonant circuit and to the demagnetizing resonant circuit, wherein the voltage source and all switches can be controlled by a controller, and wherein in operation, by opening and closing the switches recharging pulses from the recharging resonant circuit can be introduced into the demagnetizing resonant circuit, for prolonging the decay time until the energy from the recharging store is exhausted.

2. The circuit according to claim 1, wherein the recharging store comprises a storage capacitor.

3. The circuit according to claim 2, wherein the capacitance of the storage capacitor is at least twice as large as that of the resonant circuit capacitor.

4. The circuit according to claim 1, wherein the recharging resonant circuit comprises a recharging coil and a recharging capacitor arranged in series therewith.

5. The circuit according to claim 4, wherein in the recharging resonant circuit, a polarity reversal switch is arranged in parallel with the recharging coil and the recharging capacitor, for reversing the polarity of the charge in the recharging capacitor in a half-oscillation, with the recharging switch and the resonant circuit charging switch open.

6. A method for generating a decaying electromagnetic field using the electronic circuit according to claim 1, wherein ferromagnetic material can be demagnetized in the field during a decay time, the method comprising:

a. charging the demagnetizing resonant circuit, the recharging resonant circuit and the recharging store by means of the voltage source, while the charging switch, the recharging switch and the resonant circuit charging switch are closed, b. opening the charging switch, the recharging switch and the resonant circuit charging switch and setting in motion in the demagnetizing resonant circuit a resonance oscillation, which appears with a natural frequency and with decaying amplitude and generates a magnetic, periodic alternating demagnetizing field, c. briefly closing and opening the resonant circuit charging switch, which causes a first recharging pulse, short in comparison to the resonance oscillation, to flow from the recharging resonant circuit into the demagnetizing resonant circuit, d. briefly closing and opening the recharging switch to charge the recharging resonant circuit through the recharging store, e. repeating steps c and d until the energy supply in the recharging store is exhausted.

7. The method according to claim 6, wherein in step c, immediately after the first recharging pulse, one or more further short recharging pulses with the same sign are transferred to the demagnetizing resonant circuit, wherein the total duration of these recharging pulses is at most one quarter of an oscillation period of the resonance oscillation.

8. The method according to claim 6, wherein the first recharging pulse is fed in immediately after the zero crossing of the resonant circuit voltage in the resonance oscillation of the demagnetizing resonant circuit.

9. The method according to claim 8, wherein in step e, the sign of the first recharging pulse changes with each repetition of step c.

10. The method according to claim 9, wherein the recharging resonant circuit comprises a recharging coil and a recharging capacitor arranged in series therewith, wherein in the recharging resonant circuit, a polarity reversal switch is arranged in parallel with the recharging coil and the recharging capacitor, for reversing the polarity of the charge in the recharging capacitor in a half-oscillation, with the recharging switch and the resonant circuit charging switch open, and wherein the polarity of the charge in the recharging capacitor is reversed by closing the polarity reversing switch with the recharging switch open and the resonant circuit charging switch open, causing a resonance oscillation of the capacitor and the recharging coil to appear in the recharging resonant circuit, which is interrupted again after a half-oscillation by opening the polarity reversing switch.

11. The method according to claim 9, wherein each subsequent step c begins exactly after one half-period of the resonance oscillation in each case.

12. The method according to claim 6, wherein at or before the start of the method a ferromagnetic workpiece is brought into the effective range of the demagnetizing resonant circuit in order to demagnetize the workpiece.

13. The method according to claim 12, wherein the method is repeated multiple times.

14. The method according to claim 6, wherein the demagnetizing resonant circuit comprises a demagnetizing coil and a resonant circuit switch in series therewith, and a resonant circuit capacitor arranged in parallel to the demagnetizing coil and resonant circuit switch and wherein the resonance oscillation is set in motion by closing the resonant circuit switch.

15. The circuit according to claim 1, wherein the demagnetizing resonant circuit comprises a demagnetizing coil and a resonant circuit switch in series therewith, and a resonant circuit capacitor arranged in parallel to the demagnetizing coil and resonant circuit switch.

16. The circuit according to claim 1, wherein the natural frequency of the recharging resonant circuit is at least 10 times greater than the natural frequency of the demagnetizing resonant circuit.

17. The circuit according to claim 1, wherein a rectifier diode is arranged in the conductor loop in series with the voltage source and the charging switch, in such a way that the diode can prevent feedback from the recharging store, from the recharging resonant circuit and the demagnetizing resonant circuit into the voltage source during use.

18. The circuit according to claim 1, wherein the voltage source is the only voltage source in the circuit.

* * * * *